United States Patent
Yoon et al.

(10) Patent No.: US 8,735,008 B2
(45) Date of Patent: May 27, 2014

(54) FUEL CELL SYSTEM

(75) Inventors: Seong-Kee Yoon, Suwon-si (KR);
Young-Soo Joung, Yongin-si (KR);
Jung-Kurn Park, Suwon-si (KR);
Hye-Jung Cho, Anyang-si (KR);
In-Seob Song, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 378 days.

(21) Appl. No.: 12/639,948

(22) Filed: Dec. 16, 2009

(65) Prior Publication Data

US 2010/0209788 A1 Aug. 19, 2010

Related U.S. Application Data

(60) Provisional application No. 61/153,230, filed on Feb. 17, 2009.

(51) Int. Cl.
*H01M 8/08* (2006.01)
(52) U.S. Cl.
USPC ........... 429/410; 429/413; 429/414; 429/415; 429/422; 429/452
(58) Field of Classification Search
USPC .......... 429/410, 413, 415, 422, 434, 452, 414
See application file for complete search history.

(56) References Cited

U.S. PATENT DOCUMENTS

| | | | |
|---|---|---|---|
| 7,083,657 B2 | 8/2006 | Mohring et al. | |
| 7,833,672 B2 | 11/2010 | Bronold et al. | |
| 2003/0148151 A1 | 8/2003 | Preidel | |
| 2003/0232226 A1* | 12/2003 | Morishima et al. | 429/24 |
| 2005/0008924 A1 | 1/2005 | Malhotra | |
| 2005/0208359 A1 | 9/2005 | Sato et al. | |
| 2007/0003809 A1* | 1/2007 | Luo et al. | 429/34 |
| 2007/0281200 A1* | 12/2007 | Tanaka et al. | 429/34 |
| 2008/0233449 A1* | 9/2008 | Ko et al. | 429/26 |

FOREIGN PATENT DOCUMENTS

| | | |
|---|---|---|
| CN | 1922746 A | 2/2007 |
| CN | 101140998 A | 3/2008 |
| DE | 10 2004 052 806 A1 | 4/2006 |

(Continued)

OTHER PUBLICATIONS

European Search Report dated Jun. 18, 2010, for corresponding European Patent application 10250278.8, noting listed references in this IDS.

(Continued)

*Primary Examiner* — Patrick Ryan
*Assistant Examiner* — Alex Usyatinsky
(74) *Attorney, Agent, or Firm* — Christie, Parker & Hale, LLP

(57) ABSTRACT

A fuel cell system includes: a fuel cell stack for generating electrical energy by reacting oxidant and mixed fuel, and for discharging non-reacted fuel, oxidant, moisture, and carbon dioxide; a mixer for preparing the mixed fuel by mixing at least a portion of the non-reacted fuel, oxidant and moisture with concentrated fuel and for supplying the mixed fuel to the fuel cell stack; a fuel supply unit for supplying the concentrated fuel to the mixer; an oxidant supply unit for supplying the oxidant to the fuel cell stack; a first heat exchanger between an outlet of the fuel cell stack and the mixer; and a second heat exchanger between the mixer and an inlet of the fuel cell stack.

16 Claims, 5 Drawing Sheets

(56) References Cited

FOREIGN PATENT DOCUMENTS

| EP | 1 819 004 A1 | 8/2007 |
|---|---|---|
| EP | 1 901 380 A1 | 3/2008 |
| EP | 2 226 883 A1 | 9/2010 |
| JP | 2003-520392 A | 7/2003 |
| JP | 2004-507049 A | 3/2004 |
| JP | 2004-146370 A | 5/2004 |
| JP | 2004-178818 A | 6/2004 |
| JP | 2005-174785 A | 6/2005 |
| JP | 2006-508516 A | 3/2006 |
| JP | 2007-87674 A | 4/2007 |
| JP | 2007/95591 A | 4/2007 |
| JP | 2007-141616 A | 6/2007 |
| KR | 10-2008-0023126 | 3/2008 |
| KR | 10-2008-0085325 | 9/2008 |
| WO | WO 2005/122304 A2 | 12/2005 |

OTHER PUBLICATIONS

European Office action dated Apr. 4, 2011, for corresponding European Patent application 10250278.8.

European Request to Attend, dated Jun. 20, 2012, for corresponding European Patent application 10250278.8, (3 pages).

SIPO Letters Patent dated Apr. 17, 2013, with English translation of cover page only, for corresponding Chinese Patent application 201010109495.3, (4 pages).

SIPO Office Action dated Mar. 26, 2012 issued in corresponding Application Serial No. 201010109495.3; 4 pages.

English Translation of SIPO Office Action dated Mar. 26, 2012 issued in corresponding Application Serial No. 201010109495.3; 6 pages.

* cited by examiner

FUEL CELL SYSTEM

CROSS-REFERENCE TO RELATED APPLICATION

This application claims priority to and the benefit of U.S. Provisional Patent Application No. 61/153,230, filed Feb. 17, 2009, the entire content of which is incorporated herein by reference.

BACKGROUND (a) Field

The following description relates to a fuel cell system.

(b) Description of the Related Art

Fuel cells are devices that electrochemically generate power by using fuel (hydrogen or reformed gas) and oxidant (oxygen or air) and directly convert the fuel (hydrogen or reformed gas) and oxidant (oxygen or air) supplied from the outside into electrical energy by an electrochemical reaction.

Pure oxygen or air containing a large amount of oxygen is used as the oxidant of the fuel cell and pure hydrogen or fuel containing a large amount of hydrogen, which is generated by reforming hydrocarbon-based fuel (LNG, LPG, $CH_3OH$, etc.), is used as the fuel.

Hereinafter, a direct methanol fuel cell (DMFC) will be primarily described from among the fuel cells, for better comprehension and ease of description. The direct methanol fuel cell supplies high-concentration methanol to a fuel cell stack to generate electricity by reaction with the oxygen.

The direct methanol fuel cell uses high-concentration fuel to increase energy weight density. Water consumed in an anode is supplemented with water generated in a cathode in order to use the high-concentration fuel. In a known fuel cell system, fluids discharged from an outlet of the cathode are initially condensed by a heat exchanger in order to recover the water generated in the cathode. Thereafter, the condensed fluids and non-reacted fuel discharged from the anode are separated into a liquid and gas by a gas-liquid separator. The gas separated by the gas-liquid separator is discharged to the outside, and the liquid separated by the gas-liquid separator is mixed with the fuel and supplied back to the fuel cell stack.

In the known fuel cell system, condensed fluids and the non-reacted fuel are mixed with each other in the gas-liquid separator. The non-reacted fuel that flows into the gas-liquid separator has a comparatively higher temperature than the condensed fluids. As a result, some of the condensed fluids are vaporized when mixed with the non-reacted fuel.

When the condensed fluids are vaporized, water recovery efficiency is deteriorated, and a size of an apparatus condensing the fluids discharged from the cathode needs to be large so as to recover a proper amount of water.

In addition, when a temperature is high in an external environment, a temperature in the gas-liquid separator further increases, such that the water recovery efficiency is further deteriorated.

The above information disclosed in this Background section is only for enhancement of understanding of the background of the invention, and therefore may contain information that does not form the prior art that is already known in this country to a person of ordinary skill in the art.

SUMMARY OF THE INVENTION

An aspect of an exemplary embodiment of the present invention is directed toward a fuel cell system with improved water recovery efficiency.

Another aspect of an exemplary embodiment of the present invention is directed toward a fuel cell system with reduced volume.

An exemplary embodiment of the present invention provides a fuel cell system including a fuel cell stack for generating electrical energy by reacting oxidant and mixed fuel, and for discharging non-reacted fuel, oxidant, moisture, and carbon dioxide; a mixer for preparing the mixed fuel by mixing at least a portion of the non-reacted fuel, oxidant and moisture with concentrated fuel and for supplying the mixed fuel to the fuel cell stack; a fuel supply unit for supplying the concentrated fuel to the mixer; an oxidant supply unit for supplying the oxidant to the fuel cell stack; a first heat exchanger between an outlet of the fuel cell stack and the mixer; and a second heat exchanger between the mixer and an inlet of the fuel cell stack.

Another exemplary embodiment of the present invention provides a fuel cell system including: a fuel cell stack for electrochemically reacting oxidant and mixed fuel, for outputting electrical energy, and for discharging fuel, oxidant and moisture not reacted in the electrochemical reaction; a fuel supply unit for supplying concentrated fuel; an oxidant supply unit for supplying the oxidant to the fuel cell stack; a first gas-liquid separator for receiving the discharged fuel, oxidant, moisture, and carbon dioxide, and for separating the discharged fuel, oxidant and moisture into a first gas and a first liquid; a first heat exchanger for cooling and at least partially condensing the first gas; a second gas liquid separator for separating the partially condensed first gas into a second gas and a second liquid; a mixer for preparing the mixed fuel by mixing the concentrated fuel supplied from the fuel supply unit, the first liquid, and the second liquid; and a second heat exchanger for cooling the mixed fuel.

Still another exemplary embodiment of the present invention provides a recovery unit for a fuel cell system, including: a first gas-liquid separator having an inlet, a first outlet, and a second outlet, the inlet of the first gas-liquid separator connected to one or more outlets of a fuel cell stack; a first heat exchanger having an inlet and an outlet, the inlet of the first heat exchanger connected to the first outlet of the first gas-liquid separator; a second gas-liquid separator having an inlet, a first outlet, and a second outlet, the inlet of the second gas-liquid separator connected to the outlet of the first heat exchanger; a mixer having at least one inlet and an outlet, the at least one inlet of the mixer connected to the second outlet of the first gas-liquid separator, a first outlet of the second gas-liquid separator, and a fuel supply unit; and a second heat exchanger having an inlet and an outlet, the inlet of the second heat exchanger connected to the outlet of the mixer, and the outlet of the second heat exchanger connected to an inlet of the fuel cell stack.

As such, according to exemplary embodiments of the present invention, water recovery efficiency is improved by cooling the gas separated by the first gas-liquid separator, and separating the liquid from the cooled materials.

DESCRIPTION OF REFERENCE NUMERALS INDICATING ELEMENTS IN THE DRAWINGS

| | |
|---|---|
| 100: Fuel cell system | 10: Fuel supply unit |
| 12: Fuel tank | 20: Oxidant supply unit |
| 25: Oxidant pump | 26: Oxidant control valve |
| 30: Fuel cell stack | 31: Electrode assembly |
| 32, 33: Separator | 35: Electricity generating unit |
| 37, 38: End plate | 37a: First inlet |
| 37b: Second inlet | 38: End plate |
| 38a: First outlet | 38b: Second outlet |
| 40: Recovery unit | 41: First gas-liquid separator |
| 42: First heat exchanger | 43: Second gas-liquid separator |
| 45: Mixer | 47: Buffer device |
| 47a: Filter | 48: Second heat exchanger |

DETAILED DESCRIPTION OF THE EMBODIMENTS

The present invention will be described more fully hereinafter with reference to the accompanying drawings, in which exemplary embodiments of the invention are shown. As those skilled in the art will recognize, the described embodiments may be modified in various different ways without departing from the spirit or scope of the present invention.

Figure 1:
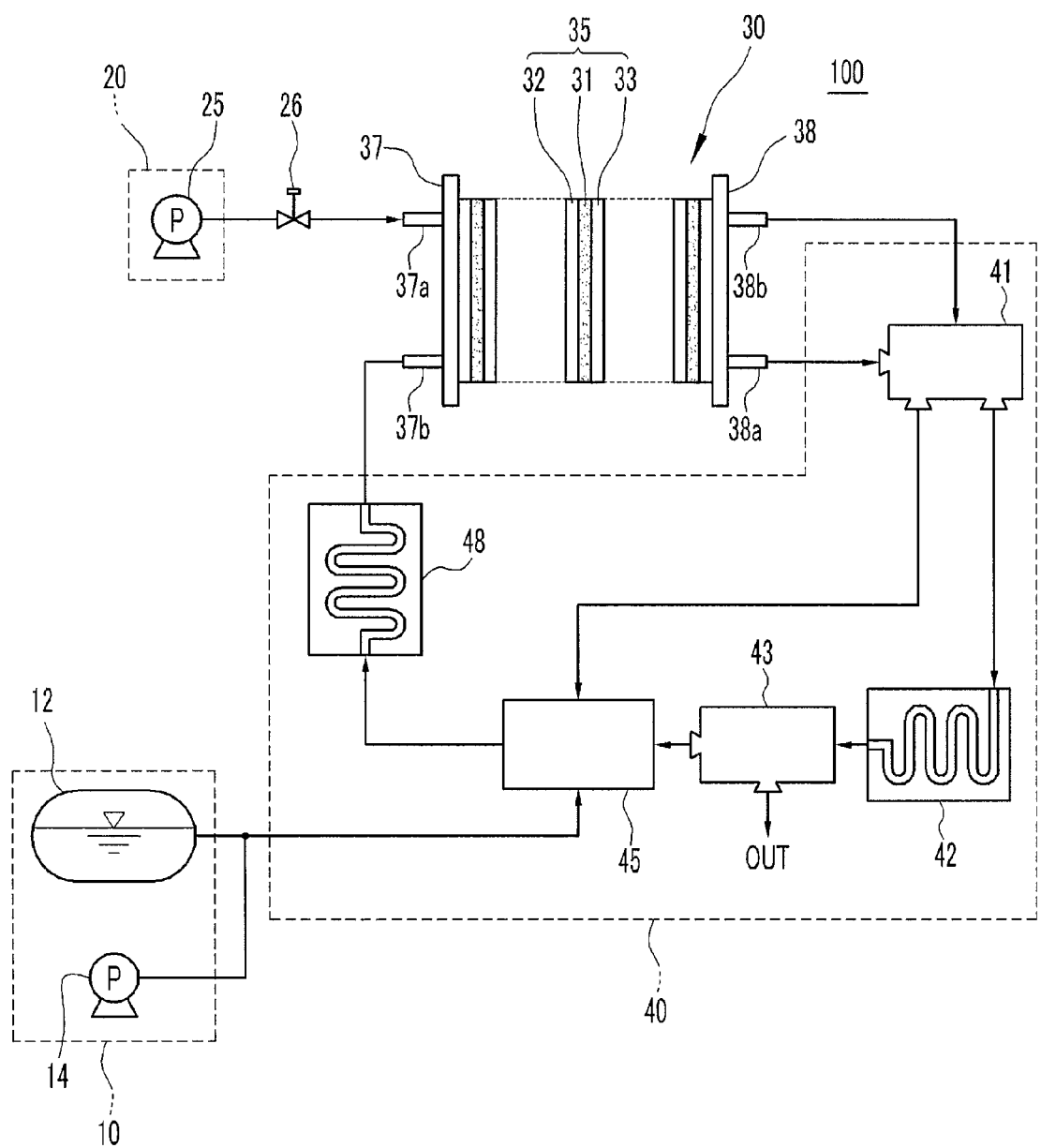
FIG. 1 is a schematic diagram illustrating a fuel cell system according to an exemplary embodiment of the present invention.

FIG. 1 is a schematic diagram illustrating a fuel cell system according to an exemplary embodiment of the present invention.

Referring to the above-mentioned figure, the fuel cell system 100 according to an exemplary embodiment of the present invention may adopt a direct methanol fuel cell scheme that generates electrical energy by direct reaction of methanol and oxygen.

However, the present invention is not limited thereto, for example, the fuel cell system according to the exemplary embodiment may be configured by a direct oxidation fuel cell scheme that reacts liquid or gas fuel containing hydrogen, such as ethanol, LPG, LNG, gasoline, butane gas, or other applicable fuel, with oxygen. Further, the fuel cell system may be configured with a polymer electrolyte membrane fuel cell (PEMFC) that utilizes the fuel by reforming the fuel into reformed gas containing sufficient hydrogen.

The fuel used in the fuel cell system 100 generally represents hydrocarbon-based fuel in a liquid or gas state, such as methanol, ethanol, natural gas, LPG, or other similar fuel.

In addition, the fuel cell system 100 may use oxygen gas stored in an additional storing member or air as oxidant that reacts with hydrogen.

The fuel cell system 100 according to the exemplary embodiment includes a fuel cell stack 30 that generates power by using the fuel and the oxidant, a fuel supply unit 10 that supplies the fuel to the fuel cell stack 30, an oxidant supply unit 20 that supplies the oxidant to the fuel cell stack 30, and a recovery unit 40 that recovers a non-reacted fuel and moisture discharged from the fuel cell stack 30 and resupplies the non-reacted fuel and the moisture to the fuel cell stack 30.

The fuel supply unit 10 is connected with the fuel cell stack 30 and includes a fuel tank 12 that stores liquified fuel and a fuel pump 14 that is connected to the fuel tank 12. The fuel pump 14 serves to discharge the liquified fuel stored in the fuel tank 12 by a pumping force (e.g., a predetermined pumping force). In the exemplary embodiment, the fuel stored in the fuel supply unit 10 may include high-concentration methanol containing about 100% MeOH.

The oxidant supply unit 20 is connected with the fuel cell stack 30 and includes an oxidant pump 25 that supplies external air to the fuel cell stack 30 by a pumping force (e.g., a predetermined pumping force). Here, an oxidant control valve 26 that controls a supply of the oxidant is installed between the fuel cell stack 30 and the oxidant supply unit 20.

Figure 2:
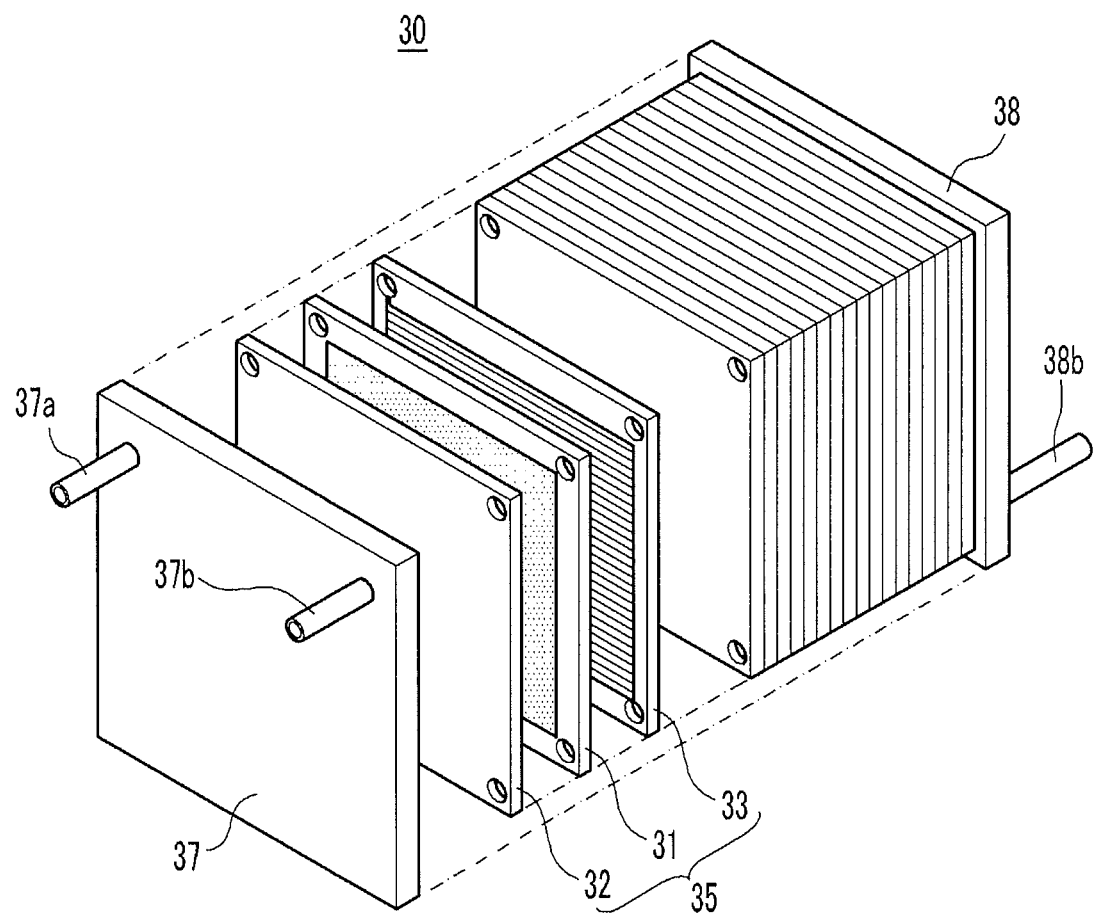
FIG. 2 is an exploded perspective schematic view illustrating a structure of a fuel cell stack shown in FIG. 1.

FIG. 2 is an exploded perspective schematic view illustrating a structure of the fuel cell stack shown in FIG. 1.

Referring to FIGS. 1 and 2, the fuel cell stack 30 includes a plurality of electricity generating units 35 that generate electrical energy by inducing oxidation and reduction reactions between the fuel and the oxidant.

Each of the electricity generating units 35 represents a unit cell that generates the electricity and includes a membrane-electrode assembly (MEA) 31 that oxidizes and reduces the fuel and the oxidant, and separators (also referred to as bipolar plates) 32 and 33 that supply the fuel and the oxidant to the membrane-electrode assembly 31.

The electricity generating unit 35 has a structure in which the separators 32 and 33 are disposed at respective sides around the membrane-electrode assembly 31. The membrane-electrode assembly 31 includes an electrolyte membrane disposed at the center thereof, a cathode electrode disposed at one side of the electrolyte membrane, and an anode electrode disposed at the other side of the electrolyte membrane.

The separators 32 and 33 are in close contact with the membrane-electrode assembly 31 interposed therebetween. The separators 32 and 33, each having a fuel passage and an air passage, are at respective sides of the membrane-electrode assembly 31. Here, the fuel passage is disposed at the anode electrode of the membrane-electrode assembly 31 and the air passage is disposed at the cathode electrode of the membrane-electrode assembly 31. In addition, the electrolyte membrane enables ion exchange in which hydrogen ions generated from the anode electrode move to the cathode electrode and are bound to oxygen from the cathode electrode to generate water.

Therefore, in the anode electrode, the hydrogen is resolved into electrons and protons (hydrogen ions) by an oxidation reaction. Further, the proton moves to the cathode electrode through the electrolyte membrane and the electrons do not move through the electrolyte membrane, and instead move to the cathode electrode of the adjacent membrane-electrode assembly 31 through the separator 33. Here, flow of the electrons generates current. Further, in the cathode electrode, moisture is generated by a reduction reaction of the moving protons and electrons and the oxygen.

In the fuel cell system 100, the plurality of electricity generating units 35 are successively arranged (or stacked adjacent to one another) to constitute the fuel cell stack 30. Herein, end plates 37 and 38 for integrally fixing the fuel cell stack 30 are installed on outer portions of the fuel cell stack 30.

A first inlet 37a for supplying the oxidant to the stack and a second inlet 37b for supplying the fuel to the fuel cell stack 30 are formed in one end plate 37. Further, a first outlet 38a for discharging non-reacted air containing moisture generated by bonding reaction of hydrogen and oxygen in the cathode electrode of the membrane-electrode assembly 31, and a second outlet 38b for discharging non-reacted fuel and other materials (e.g., carbon dioxide) after reaction in the anode electrode of the membrane-electrode assembly 31, are formed in the other end plate 38.

Meanwhile, the recovery unit 40 includes a first gas-liquid separator 41 that collects the materials (e.g., fluids, etc.) discharged from the discharging outlets 38a and 38b and separates them into gas and liquid, a first heat exchanger 42 that cools the gas discharged from the first gas-liquid separator 41, a second gas-liquid separator 43 that separates the fluids discharged from the first heat exchanger 42 into gas and liquid, and a mixer 45 that mixes the liquid from the second gas-liquid separator 43 and the liquid from the first gas-liquid separator 41.

The first gas-liquid separator 41 installed at an outlet side of the fuel cell stack 30 may include a centrifugal pump or an electrokinetic pump, or a separation membrane (e.g., a polytetrafluoroethylene (PTFE) membrane). The first gas-liquid separator 41 mixes the non-reacted fuel discharged from the second outlet 38b with the non-reacted air or oxidant containing the moisture discharged from the first outlet 38a to separate the mixed non-reacted fuel and air into liquid and gas.

The gas discharged from the first gas-liquid separator 41 moves to the first heat exchanger 42, and the liquid moves to the mixer 45. The first heat exchanger 42 cools the gas discharged from the first gas-liquid separator 41 and condenses the gas into liquid. The non-reacted fuel and moisture discharged from the fuel cell stack 30 have a relatively high temperature. Therefore, some of the gas is condensed into liquid to decrease the temperature of the gas in the first heat exchanger 42.

The liquid and gas that are condensed in the first heat exchanger 42 are transferred to the second gas-liquid separator 43. The second gas-liquid separator 43 may include a centrifugal pump or an electrokinetic pump or a separation membrane, like the first gas-liquid separator 41.

The liquid discharged from the second gas-liquid separator 43 is transferred to the mixer 45, and the gas is discharged to the outside. The liquid transferred from both the first gas-liquid separator 41 and the second gas-liquid separator 43 flows into the mixer 45. The liquid includes the mixed non-reacted fuel and the moisture. Further, high-concentration fuel transferred from the fuel supply unit 10 flows into the mixer 45, and the high-concentration fuel is diluted into a proper-concentration fuel through mixing with the moisture in the mixer.

The mixed fuel is transferred to the second heat exchanger 48. The second heat exchanger 48 decreases the temperature of the fuel and supplies the fuel to the fuel cell stack 30.

When the liquid is separated by the first gas-liquid separator 41 and the gas is cooled by the first heat exchanger 42, vaporization of the fuel due to a difference in the temperature between the non-reacted fuel and the non-reacted air is minimized or reduced. In the related art, when the non-reacted air and the non-reacted fuel are mixed and separated in the gas-liquid separator after the non-reacted air is condensed, the non-reacted air having a comparatively lower temperature is heated, such that the condensed liquid is vaporized. When the condensed liquid is vaporized, a condensing effect of the non-reacted air decreases and a condenser having a large volume is needed to accommodate the vaporization.

However, in the exemplary embodiment, when only the gas is cooled after the gas and the liquid are separated from each other, the size of the heat exchanger can be markedly decreased in comparison with related art that cools both the liquid and the gas. Further, as described above, since there are two heat exchangers, the size of the first heat exchanger 42 can be decreased in comparison with the heat exchanger used in related art.

Further, the fluids discharged from the first heat exchanger 42 flow into the second gas-liquid separator 43 to separate the gas and the liquid, whereby recovery efficiency of water is improved in comparison with the related art. When heat exchangers of the same volumes are employed, the recovery efficiency of water improves about 30%. This is because some liquid is first separated in the first gas-liquid separator 41, and the fluids generated from the cooled gas are then separated into liquid and gas in the second gas-liquid separator 43.

Further, the fluids discharged from the mixer 45 are cooled by the second heat exchanger 48. Therefore, the temperature of the fuel that flows into the second inlet 37b through the second heat exchanger 48 can be properly controlled. In particular, when the temperature is decreased by stages by installing, for example, two heat exchangers, the temperature can be further decreased and the size of the heat exchangers may be formed smaller in comparison to related art in which one heat exchanger is used. That is, according to the exemplary embodiment, the total size of two heat exchangers may be smaller than the size of one heat exchanger in the related art.

Figure 3:
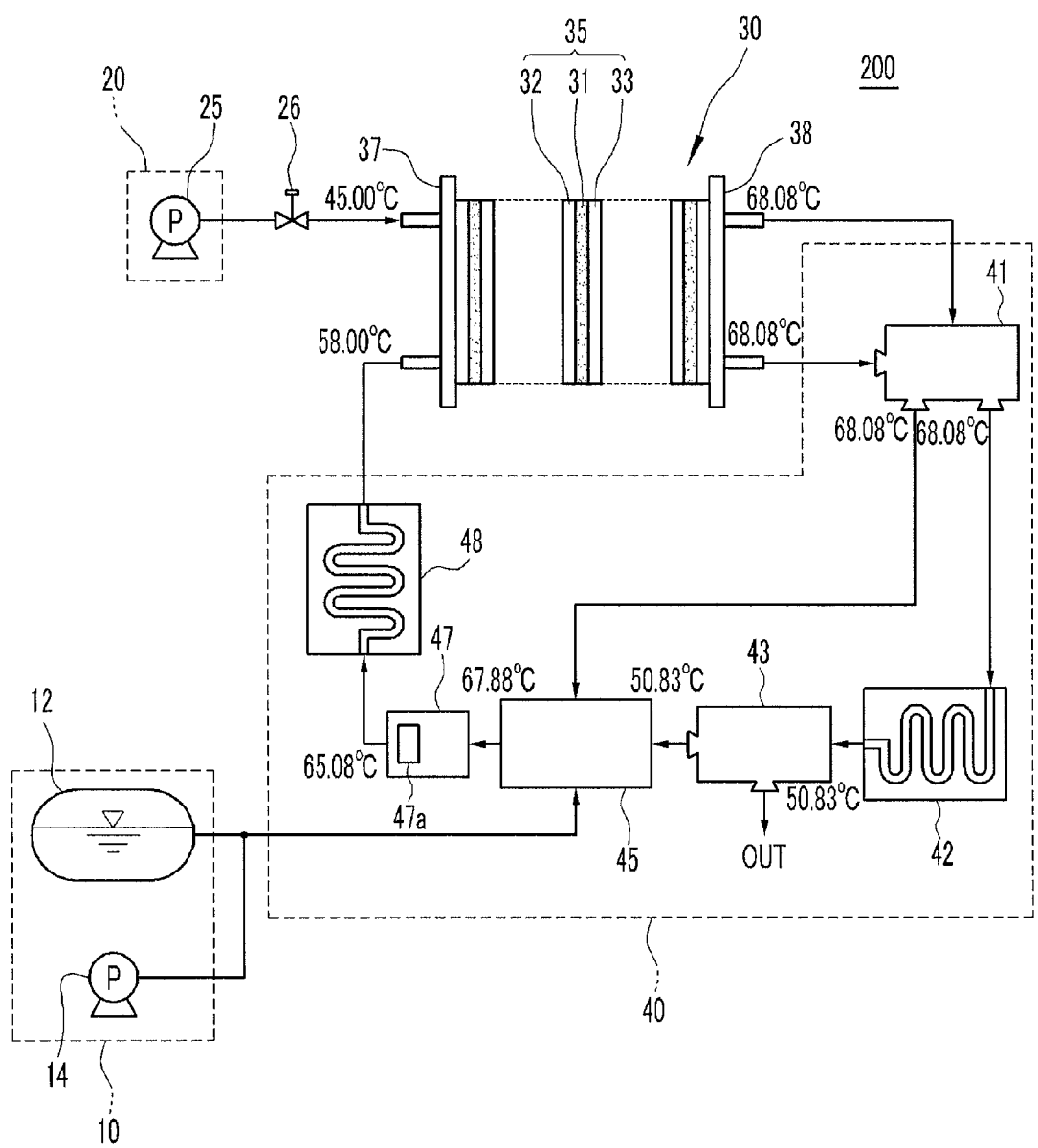
FIG. 3 is a schematic diagram illustrating a fuel cell system according to another exemplary embodiment of the present invention.

FIG. 3 is a schematic diagram of a fuel cell system according to another exemplary embodiment of the present invention.

Referring to FIG. 3, the fuel cell system 200 according to the exemplary embodiment further includes a buffer device 47 that is installed between the mixer 45 and the second heat exchanger 48.

Except for the buffer device 47, the fuel cell system 200 according to the exemplary embodiment has substantially the same structures as the fuel cell system according to the exemplary embodiment of FIG. 1. Therefore, these same structures will not be described again.

The buffer device 47 serves to temporarily store the fuel so as to supply fuel of an amount (e.g., a predetermined amount) to the fuel cell stack 30. A filter 47a for intercepting or filtering impurities from flowing into the fuel cell stack 30 may be installed in the buffer device 47. The filter 47a may include various kinds of filtering devices that filter the impurities contained in the liquid.

Through operation of the fuel cell system 200 according to the present exemplary embodiment, under an external environment of 45° C., the exemplary temperatures of the fluids in various portions of the fuel cell system 200 will be described below.

The non-reacted fuel and the non-reacted air that are discharged from the fuel cell stack 30 have a comparatively high temperature of 68.08° C. Liquid and Gas discharged from the first gas-liquid separator 41, also have a temperature of 68.08° C. Thereafter, the gas is cooled to 50.83° C. by the first heat exchanger 42.

The fluids cooled by the first heat exchanger 42 are separated into the liquid and the gas by the second gas-liquid separator 43. In this case, the temperature of the fluids discharged from the second gas-liquid separator 43 is also 50.83° C. The liquid discharged from the second gas-liquid separator 43 flows into the mixer 45. Here, the liquid discharged from the second gas-liquid separator 43 is mixed with the liquid separated by the first gas-liquid separator 41, such that the temperature of the mixed fluid increases to 67.88° C. The temperature of the fluid discharged from the mixer 45 and through the buffer device 47 decreases to 65.08° C., and the temperature of the fluid passing through the second heat exchanger 48 decreases to 58° C., such that the fluid is supplied to the fuel cell stack at about 58° C.

As described above, the first heat exchanger 42 serves to condense some of the gas from the first gas-liquid separator 41 into a liquid, and the second heat exchanger 48 serves to decrease the temperature of the fuel that flows into the fuel cell stack 30, thereby controlling the temperature of the fuel that flows into the fuel cell stack 30.

As such, when the temperature of the fuel that flows into the fuel cell stack 30 is controlled, the internal temperature of the fuel cell stack 30 and the temperature of the fluid discharged from the fuel cell stack 30 may be more readily controlled.

Figure 4:
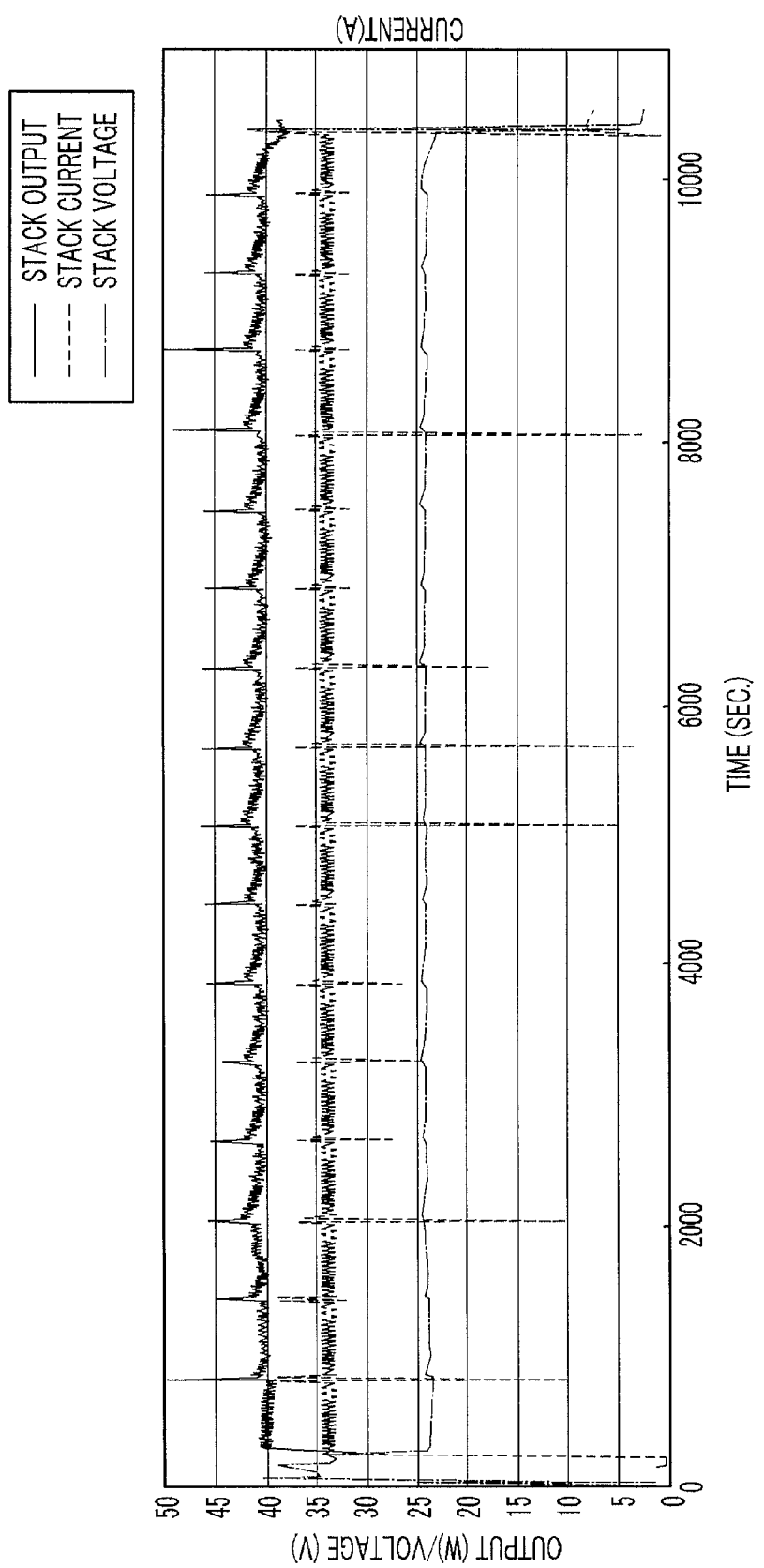
FIG. 4 is a graph illustrating evaluation of a stack operation of a fuel cell system according to a first exemplary embodiment of the present invention.
Figure 5:
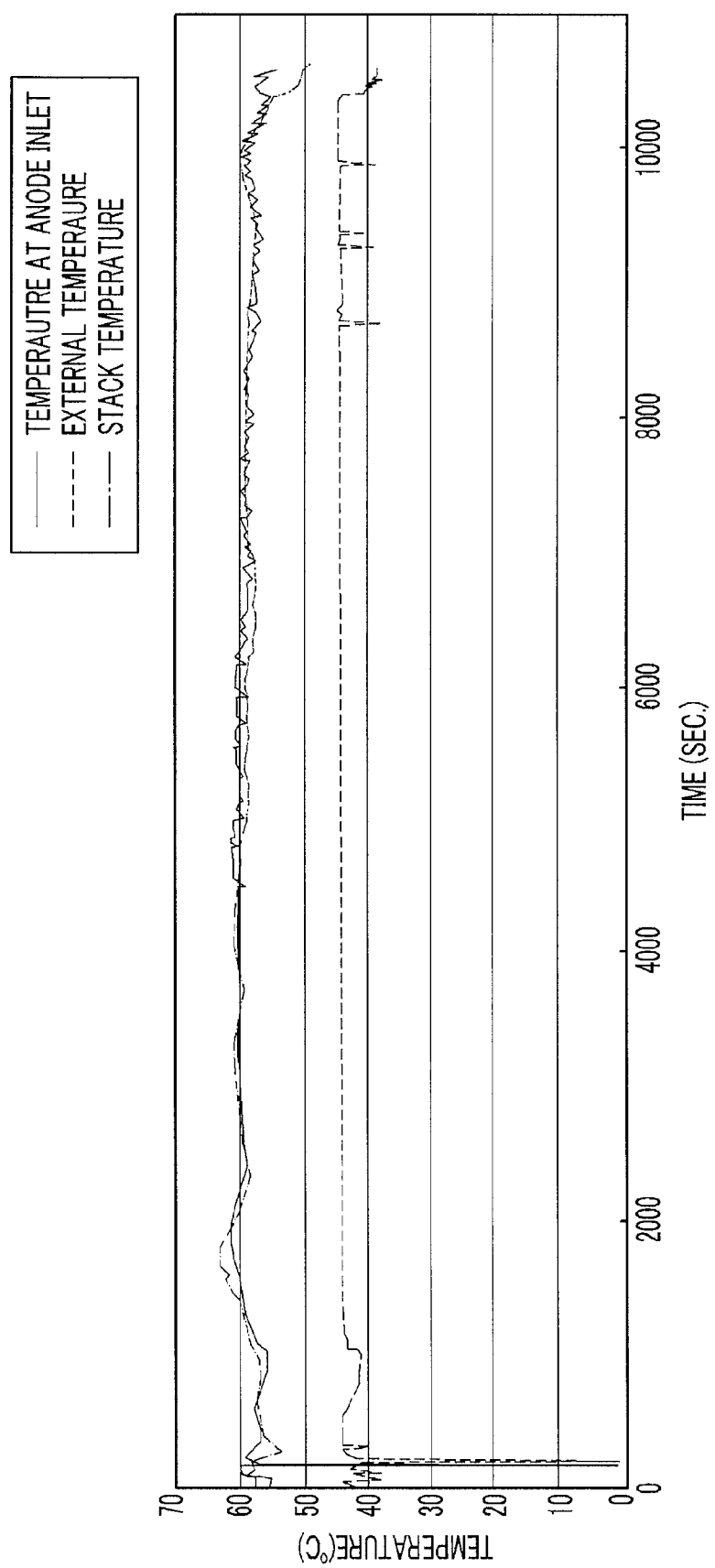
FIG. 5 is a graph illustrating a temperature of a stack and a temperature of non-reacted fuel discharged from the stack according to a first exemplary embodiment of the present invention.

FIG. 4 is a graph illustrating evaluation of a stack operation of a fuel cell system according to an exemplary embodiment of the present invention. FIG. 5 is a graph illustrating a temperature of a stack and a temperature of non-reacted fuel discharged from the stack according to an exemplary embodiment of the present invention.

Referring to FIGS. 4 and 5, FIGS. 4 and 5 illustrate an operating result of the fuel cell system according to the exemplary embodiment of the present invention, under an external temperature of 45° C. A fuel cell used in the test included properties, such as system output 25 W (stack output 36 W), system voltage 16.4V, diluted fuel flow rate 25 cc/min, and weight 1.8 kg. As shown in FIG. 4, the fuel cell system according to the exemplary embodiment has a stable output.

Further, referring to FIG. 5, when the external temperature is 45° C., the temperature of the stack is constantly maintained at about 60° C. or less. In contrast, when the heat exchanger of the same volume is employed in the related art fuel cell, the temperature of the stack is at about 65° C. or more.

As such, according to the exemplary embodiments of the present invention, the internal temperature of the stack may be more readily controlled, and a more stable output may be more readily achieved.

While this invention has been described in connection with what is presently considered to be practical exemplary embodiments, it is to be understood that the invention is not limited to the disclosed embodiments, but is instead intended to cover various modifications and equivalent arrangements included within the spirit and scope of the appended claims.

What is claimed is:

1. A fuel cell system comprising:
  a fuel cell stack
    for generating electrical energy by reacting oxidant and mixed fuel to produce a cathode output stream comprising moisture and non-reacted oxidant, and an anode output stream comprising non-reacted fuel and carbon dioxide, and
    for discharging the non-reacted fuel, the non-reacted oxidant, the moisture, and the carbon dioxide;
  a mixer
    for preparing the mixed fuel by mixing at least a portion of the non-reacted fuel and the moisture with concentrated fuel, and
    for supplying the mixed fuel to the fuel cell stack;
  a fuel supply unit for supplying the concentrated fuel to the mixer;
  an oxidant supply unit for supplying the oxidant to the fuel cell stack;
  a first gas-liquid separator for
    receiving the cathode output stream and the anode output stream,
    separating the non-reacted fuel, the non-reacted oxidant, and the moisture into a first gas and a first liquid,
    discharging the first gas, and
    supplying the first liquid to the mixer;
  a first heat exchanger between the first gas-liquid separator and the mixer, the first heat exchanger for
    receiving the first gas,
    cooling and partially condensing the first gas into a first fluid, and
    discharging the first fluid; and
  a second heat exchanger between the mixer and an inlet of the fuel cell stack.

2. The fuel cell system of claim 1, further comprising:
  a second gas-liquid separator for
    receiving the first fluid,
    separating the first fluid into a second gas and a second liquid, and
    supplying the second liquid to the mixer.

3. The fuel cell system of claim 2, wherein the second heat exchanger is configured to cool the mixed fuel prior to supplying the mixed fuel to the fuel cell stack.

4. The fuel cell system of claim 1, wherein the first gas-liquid separator is configured to receive all the discharged non-reacted fuel, the discharged non-reacted oxidant, and the discharged moisture.

5. The fuel cell system of claim 1, wherein the first gas-liquid separator comprises one of a centrifugal pump, an electrokinetic pump, or a separation membrane.

6. The fuel cell system of claim 5, wherein the separation membrane comprises a PTFE membrane.

7. The fuel cell system of claim 2, wherein the second gas-liquid separator comprises one of a centrifugal pump or an electrokinetic pump.

8. The fuel cell system of claim 1, further comprising a buffer between the mixer and the second heat exchanger for temporarily storing the mixed fuel to control an amount of the mixed fuel supplied to the second heat exchanger.

9. The fuel cell system of claim 8, wherein the buffer comprises a filter for removing impurities from the mixed fuel.

10. A fuel cell system comprising:
  a fuel cell stack
    for electrochemically reacting oxidant and mixed fuel to produce
      a cathode output stream comprising moisture and oxidant not reacted in the electrochemical reaction, and
      an anode output stream comprising carbon dioxide and fuel not reacted in the electrochemical reaction,
    for outputting electrical energy,
    for discharging the cathode output stream as discharged moisture and discharged oxidant not reacted in the electrochemical reaction, and
    for discharging the anode output steam as discharged carbon dioxide and discharged fuel not reacted in the electrochemical reaction;
  a fuel supply unit for supplying concentrated fuel;
  an oxidant supply unit for supplying the oxidant to the fuel cell stack;
  a first gas-liquid separator
    for receiving the cathode output stream and the anode output stream, and
    for separating the discharged fuel, the discharged oxidant, and the discharged moisture into a first gas and a first liquid;
  a first heat exchanger for cooling and at least partially condensing the first gas;

a second gas liquid separator for separating the partially condensed first gas into a second gas and a second liquid;

a mixer for preparing the mixed fuel by mixing the concentrated fuel supplied from the fuel supply unit, the first liquid, and the second liquid; and a second heat exchanger for cooling the mixed fuel.

11. The fuel cell system of claim 10, wherein the discharged fuel, the discharged oxidant, and the discharged moisture comprises non-reacted oxidant from a cathode electrode side of a membrane-electrode assembly of the fuel cell stack and non-reacted fuel from an anode electrode side of the membrane-electrode assembly of the fuel cell stack, and wherein all of the non-reacted oxidant and all of the non-reacted fuel are both supplied to the first gas-liquid separator.

12. A recovery unit for a fuel cell system, comprising:

a first gas-liquid separator having an inlet, a first outlet, and a second outlet, the inlet of the first gas-liquid separator connected to one or more outlets of a fuel cell stack and configured to receive an anode output stream comprising non-reacted fuel and carbon dioxide from the fuel cell stack, and a cathode output stream comprising non-reacted oxidant and moisture, the first gas-liquid separator configured to separate the non-reacted fuel, the non-reacted oxidant, and the moisture into a first gas and a first liquid, and discharge the first gas via the first outlet of the first gas-liquid separator and the first liquid via the second outlet of the first gas-liquid separator;

a first heat exchanger having an inlet and an outlet, the inlet of the first heat exchanger connected to the first outlet of the first gas-liquid separator and configured to receive the first gas, the first heat exchanger configured to cool and partially condense the first gas into a first fluid, and discharge the first fluid via the outlet of the first heat exchanger;

a second gas-liquid separator having an inlet, a first outlet, and a second outlet, the inlet of the second gas-liquid separator connected to the outlet of the first heat exchanger;

a mixer having at least one inlet and an outlet, the at least one inlet of the mixer connected to the second outlet of the first gas-liquid separator, a first outlet of the second gas-liquid separator, and a fuel supply unit; and a second heat exchanger having an inlet and an outlet, the inlet of the second heat exchanger connected to the outlet of the mixer, and the outlet of the second heat exchanger connected to an inlet of the fuel cell stack.

13. The recovery unit of claim 12, wherein:

the second gas-liquid separator is for receiving the first fluid from the first heat exchanger, for separating the first fluid into a second gas and a second liquid, and for supplying the second liquid to the mixer;

the mixer is for receiving the first liquid from the first gas-liquid separator, the second liquid from the second gas-liquid separator, and concentrated fuel from the fuel supply unit, for preparing mixed fuel by mixing the first liquid, the second liquid, and the concentrated fuel, and for supplying the mixed fuel to the second heat exchanger; and the second heat exchanger is for receiving the mixed fuel from the mixer, for cooling the mixed fuel, and for supplying the cooled mixed fuel to the fuel cell stack.

14. The recovery unit of claim 13, further comprising a buffer connected between the outlet of the mixer and the inlet of the second heat exchanger, the buffer for temporarily storing the mixed fuel to control an amount of the mixed fuel supplied to the second heat exchanger.

15. The recovery unit of claim 14, wherein the buffer comprises a filter for removing impurities from the mixed fuel.

16. The recovery unit of claim 13, further comprising the fuel cell stack, wherein the fuel cell stack is configured to receive the cooled mixed fuel from the second heat exchanger and an oxidant from an oxidant supply unit, to generate electrical energy by electrochemically reacting the cooled mixed fuel and the oxidant, and to discharge the non-reacted fuel, the non-reacted oxidant, and the moisture left after the electrochemical reaction to the first gas-liquid separator.

* * * * *